United States Patent [19]

Kelley et al.

[11] Patent Number: 4,482,294
[45] Date of Patent: Nov. 13, 1984

[54] POWER UNIT FOR SINGLE LINE PNEUMATIC TUBE SYSTEM

[75] Inventors: Charles K. Kelley; William W. Jones, both of Houston, Tex.

[73] Assignee: C. K. Kelley & Sons, Inc., Houston, Tex.

[21] Appl. No.: 371,344

[22] Filed: Apr. 23, 1982

Related U.S. Application Data

[60] Continuation of Ser. No. 038,167, May 11, 1979, Pat. No. 4,339,228, which is a division of Ser. No. 876,112, Feb. 8, 1978, Pat. No. 4,189,261.

[51] Int. Cl.³ .............................................. F04D 25/12
[52] U.S. Cl. ................................................. 415/219 R
[58] Field of Search ................ 415/219 R, 200, 121 R

[56] References Cited

U.S. PATENT DOCUMENTS

| | | | |
|---|---|---|---|
| 2,486,619 | 11/1949 | Troxler | 230/117 |
| 2,632,524 | 3/1953 | Senne | 417/423 |
| 3,053,475 | 9/1962 | Tonne | 406/1 |
| 3,286,914 | 11/1966 | Baverstock | 230/232 |

Primary Examiner—Henry C. Yuen
Assistant Examiner—John Kwon
Attorney, Agent, or Firm—James Creighton Wray

[57] ABSTRACT

A pressure-vacuum chamber is mounted in a sheet metal housing having acoustical padding on inner surfaces of walls. The chamber has two vacuum-formed truncated cone members and a longitudinally extending axial partition plate sealingly mounted in inward facing grooves in the members. A flow-through blower is sealingly mounted in an aperture in the plate.

8 Claims, 4 Drawing Figures

POWER UNIT FOR SINGLE LINE PNEUMATIC TUBE SYSTEM

This application is a continuation, of application Ser. No. 038,167, filed May 11, 1979, now U.S. Pat. No. 4,339,228 which is a division of Ser. No. 876,112, filed Feb. 8, 1978, now U.S. Pat. No. 4,189,261.

BACKGROUND OF THE INVENTION

This invention relates to a unitized single line (pressure-vacuum) pneumatic tube system capable of incorporating intermediate stations, and novel components therefor.

Traditionally, pneumatic tube systems which deliver carriers to one or several locations and back have been custom designed, requiring extensive engineering and selection of various components. Single line pneumatic tube systems are well known in the prior art as exemplified by U.S. Pat. Nos. 2,137,750 and 3,232,559 and are utilized for drive-in banking and tolls as shown in U.S. Pat. Nos. 3,599,898 and 3,976,264. Such systems normally use a high powered turbine to provide the necessary air; however, the noise level of the turbine is such that the turbines are located at a remote location from the terminals. Moreover, the air shifter valve for such a system is usually complicated and changes the direction of flow causing turbulence. Although some single line systems do use smaller blowers, they require a blower at each terminal location.

Accordingly, a need has existed for a unitized system which can be packaged and sold by the manufacturer as a complete system eliminating custom design. Also, there is a need for a simple single line pneumatic tube system having a single power unit which is sufficiently quiet that it can be installed in a room where people are working. There is also a need for an air shifter which eliminates changing direction of the air. Further, there is a need for a single line pneumatic tube system which has a minimum of noise at the end terminal and which can include intermediate terminals which can transmit a carrier in either direction without complicated valving.

SUMMARY OF THE INVENTION

The single line pneumatic tube system of the present invention is comprised basically of a central station, including a power unit and a central terminal; an end terminal; tubing connecting the terminals; and low voltage wiring. Intermediate terminals capable of transmitting a carrier in either direction may be included. The power unit includes a pressure-vacuum chamber formed of a housing having a partition plate dividing the housing into two sealed chambers. One or more through flow blowers extend through the plate. The pressure-vacuum chamber has two spaced parts. Acoustical insulation in the chamber and housing reduce noise so that the central station may be located where personnel are working.

BRIEF DESCRIPTION OF THE DRAWINGS

A preferred embodiment of the invention—illustrative of the best mode in which applicants have contemplated applying the principles—is set forth in the following description and shown in the drawings, and is particularly and distinctly pointed out and set forth in the appended claims.

DESCRIPTION OF THE PREFERRED EMBODIMENT

Figure 2:
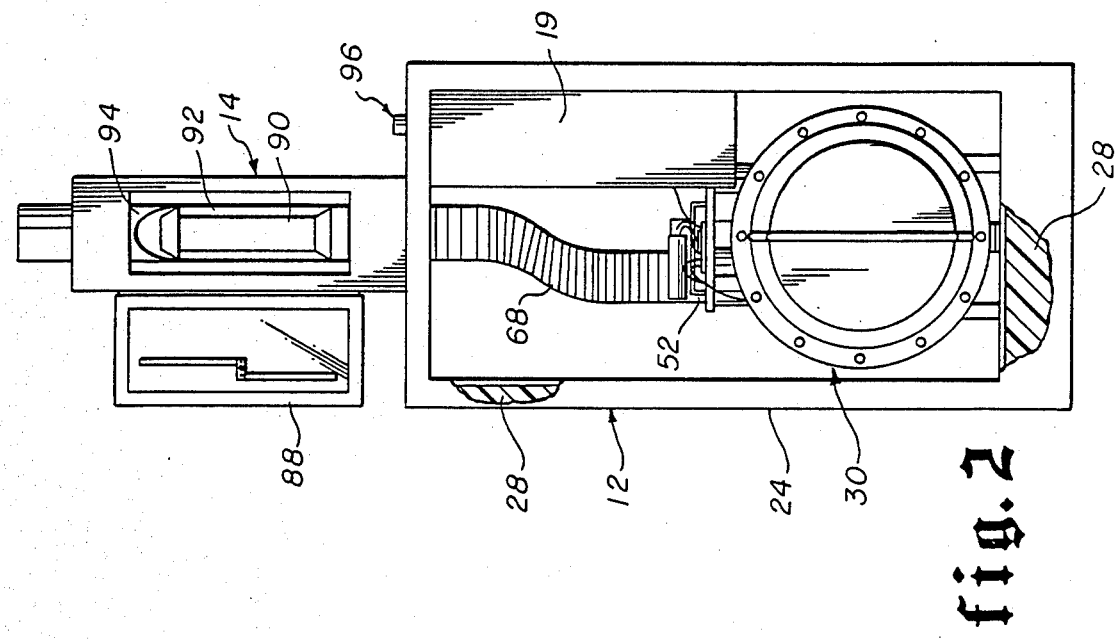
FIG. 2 is a front elevational view of the central station and power unit with the front cover of the power unit removed and the door of the central station open.
Figure 1:
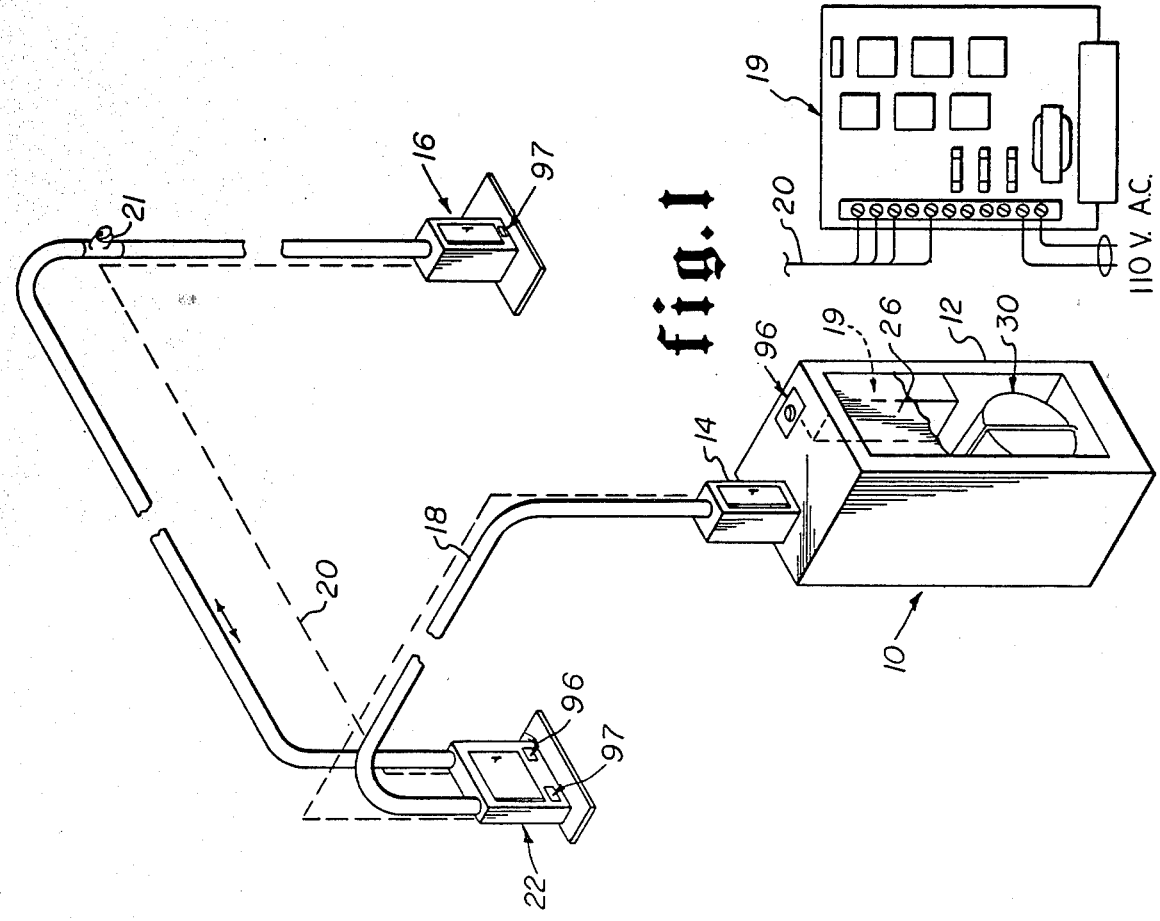
FIG. 1 is a general diagrammatic view showing the novel single tube pneumatic system of the present invention having one intermediate station.

As can be seen in FIG. 1, the basic single line pneumatic tube system of the present invention is comprised of a central station 10 which includes a power unit 12, and a central terminal 14, an end terminal 16, and tubing 18 connecting the terminals. The electronics 19 are located in the power unit and low voltage wiring 20 provides electrical connection between terminals. The tubing remote from the end terminal is provided with a flapper air relief valve 21 which will automatically exhaust air after a carrier has passed the air relief valve and therefore there is no air exhaust at the end terminal and practically no noise to disturb personnel in the area. If desired one or more intermediate terminals 22 may be incorporated into the system. The system is so designed that it may be packaged and sold by a manufacturer as a complete system eliminating custom design.

Figure 3:
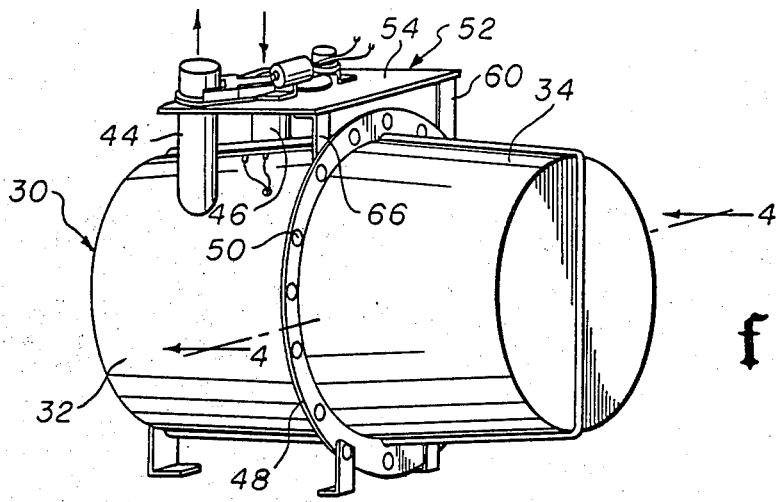
FIG. 3 is an isometric view of the pressure-vacuum chamber and air shifter valve.
Figure 4:
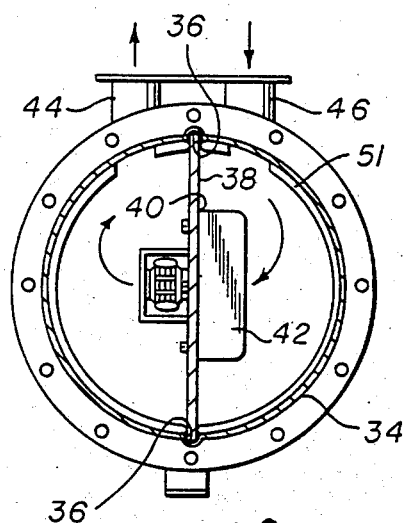
FIG. 4 is a cross sectional view taken along lines 4—4 of FIG. 3.

The central station is so designed that it resembles office furniture with the noise level being sufficiently low that it will not disturb normal office operations. The central station containing power unit 12 is the heart of the system replacing the high noise level turbine traditionally used to produce the air for the system. Moreover, the power unit 12 provides both pressure and vacuum for the entire system. The power unit 12 is formed of a rectangular sheet metal housing 24 having a removable front panel 26. All six interior sides of the housing are provided with acoustical padding 28, which may be sheets of polyester. A pressure-vacuum chamber 30 located in power unit 12 provides both pressure and vacuum, see FIG. 3. The chamber 30 is formed of two rimmed truncated cone housings 32-34 which may be vacuum formed ABS. Each housing member has diametrically opposed longitudinally extending grooves 36—36. As seen in FIG. 4, a central partition plate 38 is located in grooves 36—36. Partition 38 has at least one motor aperture 40 in which is mounted a flow through blower 42. The partition 38 is sealed in the grooves and the motor is sealed in the aperture so that when the chamber is assembled there is a pressure side and vacuum side. It has been found that Lamb Vacuum Motor, Model 115750 having a 2" orifice operates very satisfactorily producing a volume of approximately 110 cmf and a vacuum of 3.4 (inches $H_2O$). The number of motors mounted in the partition 38 will depend upon the size of the system. It has been found that one motor is sufficient for a 2½" or a 3" system, two motors for a 4" or 4½" system and three motors for a 4"×7" system delivering carriers at a speed of approximately twenty five feet per second. Accordingly, partition 38 will have the requisite number of apertures for the system. Front housing member 32 is provided with a pressure port 44 and a vaccum port 46 which are in communication with the pressure and vacuum side of the chamber respectively. The rims 48 of the housing members are provided with apertures and secured together by fasteners 50. To cut down on noise, the inside of the chamber is provided with a layer of acoustical padding 51 which may be sheet polyester. Thus pressure-vacuum chamber provides both air pressure to move a carrier from the central terminal to a remote terminal and vacuum to return the carrier from a remote terminal to the central terminal.

The entire disclosure of co-pending application Ser. No. 876,112, filed Feb. 8, 1978, now U.S. Pat. No. 4,189,261 is incorporated herein by reference. The patent provides a detailed description of the other components used in the instant pneumatic tube system. The reference numbers used in that patent correspond to the numbers used in the instant drawings.

As can be seen from the foregoing, the pneumatic tube system of the present invention is so designed that it may be packaged as a unit and easily installed. The central station includes the power unit and central terminal and the only electrical connection is attachment to a normal 120 volt alternating current outlet. Both pressure and vacuum is provided by the novel pressure-vacuum chamber that is powered by small flow through blowers.

What is claimed is:

1. A power unit for alternately providing pressure of vacuum for a single line pneumatic tube carrier delivery system comprising a housing provided with acoustical padding, a drum-like pressure-vacuum chamber having a pressure port and a vacuum port mounted within the housing, the chamber being provided with acoustical padding, a longitudinally extending partition plate sealingly diametrically dividing the chamber into a pressure chamber and a vacuum chamber, at least one flow-through blower sealingly mounted in an aperture in the longitudinally extending partition plate, each chamber being provided with one of the ports, the pressure chamber being provided with the pressure port, the vacuum chamber being provided with the vacuum port, the blower extending through and being sealingly mounted in an aperture in the partition plate.

2. The power unit specified in claim 1 wherein the pressure-vacuum chamber has a shape substantially resembling two truncated conical sections with a common base, the partition plate is a longitudinally extending axially partition plate dividing the chamber into two chambers, and the ports are mounted side-by-side within the housing.

3. The power unit specified in claim 1 wherein a plurality of blowers are mounted in the partition plate.

4. The power unit specified in claim 1 wherein the housing is formed of sheet metal.

5. The power unit specified in claim 1 wherein the acoustical padding comprises sheets of polyester.

6. The power unit specified in claim 1 wherein the chamber has inner surfaces provided with acoustical padding.

7. The power unit specified in claim 6 wherein the acoustical padding is provided on inner surfaces of the housing.

8. The power unit specified in claim 7 wherein the acoustical padding comprises sheet polyester.

* * * * *